United States Patent [19]
Hendriks et al.

[11] Patent Number: 5,337,628
[45] Date of Patent: Aug. 16, 1994

[54] ELECTRONICALLY CONTROLLED CONTINUOUSLY VARIABLE TRANSMISSION

[75] Inventors: Emery F. M. Hendriks, Heeze; Wilhelmus W. C. M. Roovers, Prinsenbeek; Bastiaan A. d'Herripon, Tilburg, all of Netherlands

[73] Assignee: Van Doorne's Transmissie B.V., Tilburg, Netherlands

[21] Appl. No.: 676,623

[22] Filed: Mar. 28, 1991

[30] Foreign Application Priority Data

Apr. 12, 1990 [NL] Netherlands ............... 9000860

[51] Int. Cl.$^5$ ............................ F16H 61/00
[52] U.S. Cl. ...................... 477/48; 251/129.07
[58] Field of Search .................... 74/866, 867; 251/129.05, 129.07, 129.15; 474/12, 18, 28, 69, 70

[56] References Cited

U.S. PATENT DOCUMENTS

| | | | |
|---|---|---|---|
| 3,538,954 | 11/1970 | Fagerlie et al. | 251/129.07 X |
| 3,688,607 | 9/1972 | Marlow | 74/866 |
| 3,754,482 | 8/1973 | Sanders et al. | 475/132 X |
| 4,425,620 | 11/1984 | Batcheller et al. | 74/866 X |
| 4,459,878 | 7/1984 | Frank | 74/857 |
| 4,546,673 | 10/1985 | Shigematsu et al. | 74/866 |
| 4,546,795 | 10/1985 | Okamoto et al. | 251/129.05 X |
| 4,589,302 | 5/1986 | Oda et al. | 74/866 |
| 4,593,581 | 6/1986 | Omitsu | 74/866 |
| 4,598,611 | 7/1986 | Frank | 74/860 |
| 4,634,096 | 1/1987 | Hara | 251/129.07 X |
| 4,662,605 | 5/1987 | Garcia | 251/129.15 X |
| 4,699,025 | 10/1987 | Omitsu | 74/866 |
| 4,718,308 | 1/1988 | Haley | 74/866 |
| 4,730,518 | 3/1988 | Miyawaki | 74/866 |
| 4,733,582 | 3/1988 | Eggert et al. | 74/866 X |
| 4,737,882 | 4/1988 | D'Onofrio | 361/154 |
| 4,764,156 | 8/1988 | Ohkumo | 74/866 X |
| 4,767,382 | 8/1988 | Tezuka et al. | 74/866 X |
| 4,771,658 | 9/1988 | Miyawaki | 74/866 |
| 4,790,216 | 12/1988 | Eggert et al. | 74/866 X |
| 4,811,225 | 3/1989 | Petzold et al. | 74/866 X |
| 4,854,920 | 8/1989 | Mimura | 74/866 X |
| 4,909,103 | 3/1990 | Morimoto | 74/866 |
| 4,982,822 | 1/1991 | Petzold et al. | 74/866 X |
| 5,011,458 | 4/1991 | Kumm | 74/866 X |
| 5,020,392 | 6/1991 | Morimoto | 74/866 |
| 5,031,481 | 7/1991 | Algrain et al. | 74/866 X |
| 5,033,571 | 7/1991 | Morimoto | 74/866 X |
| 5,056,380 | 10/1991 | Sawasaki et al. | 74/866 X |
| 5,060,747 | 10/1991 | Eto | 364/424/1 |
| 5,083,481 | 1/1992 | Smith et al. | 74/866 X |
| 5,148,722 | 9/1992 | Mehta | 74/866 |
| 5,183,439 | 2/1993 | Yumoto et al. | 474/28 |

Primary Examiner—Dirk Wright
Attorney, Agent, or Firm—Pennie & Edmonds

[57] ABSTRACT

An electronically controlled continuously variable transmission system is provided with a driving belt trained over a primary and secondary pulley. The primary pulley is provided on a primary shaft and the secondary pulley is provided on a secondary shaft. Each pulley has corresponding spaced, conical pulley halves and at least one of the corresponding pulley halves is axially movable by respective primary and secondary moving devices. The transmission further includes a primary electronic control system for controlling the transmission ratio and a secondary electronic control system for controlling the belt tension. The primary electronic control system permits the operator to select from fuel economy, sporting, and maximum comfort performance modes. The primary electronic control means controls the transmission ratio in accordance with the performance mode selected. The moving devices include standby operating valves to permit continued operation of the transmission in case of power failure.

27 Claims, 5 Drawing Sheets

ELECTRONICALLY CONTROLLED CONTINUOUSLY VARIABLE TRANSMISSION

BACKGROUND OF THE INVENTION

The invention relates to an electronically controlled continuously variable transmission of the type provided with a driving belt trained over a primary pulley provided on a primary shaft and a secondary pulley provided on a secondary shaft. Each of the pulleys comprises a pair of conical pulley halves, and at least one of the pulley halves of each pair is axially movable along the shaft by respective moving devices.

Known electronically controlled continuously variable transmissions contain a single electronic system which controls both the transmission ratio between the pulleys and the tension in the driving belt in accordance with a single predetermined operating mode.

The disadvantage of such known transmissions is that it is not possible to operate the transmission in a manner which is flexibly attuned to a user's individual wishes.

SUMMARY OF THE INVENTION

One object of the invention is to provide an electronically controlled, continuously variable transmission which allows the user to select among plural operating modes of the transmission.

For that purpose, the electronically controlled continuously variable transmission according to the invention is provided with a primary electronic control system coupled to a primary moving device, and with a secondary electronic control system coupled to a secondary moving device.

The provision of independent primary and secondary electronic control systems increases the flexibility of operation and permits the transmission ratio and the tension force to be altered based on various predetermined parameters.

As a result, the transmission according to the present invention has a considerably improved efficiency and an extended life. The primary electronic control system of the present invention includes selection devices having memories which store different data relating to respective optimum selections for corresponding operating modes of the transmission.

The advantage of this aspect of the invention is that it enables the driver of a vehicle in which the transmission is provided to select the operating performance mode he desires at a given moment. The performance mode options which may be selected comprise driving with minimal fuel consumption, with an enhanced accelerating power or with maximum comfort. Maximum comfort, for example, is achieved by reducing the variations in the transmission ratio as much as possible.

In order to realize a minimal fuel consumption wherein a minimum amount of exhaust fumes is produced by the engine, a signal corresponding to the position of an accelerator pedal of an engine coupled to the transmission is supplied to an input terminal of a first selection device. On the basis of the type of engine, an optimum selection for an instantaneously desired value of the rpm of the primary shaft is made from data stored in the memory of the first selection device. The data stored includes the motor torque values associated with the respective positions of the accelerator pedal versus the values of the corresponding rpm's of the primary shaft. The optimum primary shaft rpm selection is then supplied to an input terminal of the primary moving device, which in turn alters the primary pulley diameter, and thus, the transmission ratio.

In order to realize a sporting mode, wherein accelerating power is enhanced, a signal corresponding to the position of the accelerator pedal is supplied to a first input terminal of a second selection device. A signal corresponding to the instantaneous value of the secondary shaft rpm is supplied to a second input terminal of the second selection device. On the basis of these signals, an optimum selection for an instantaneously desired value of the rpm of the primary shaft is made from data stored in a memory of the second selection device. The stored data includes a predetermined relationship between actual instantaneous secondary shaft rpm and desired instantaneous primary shaft rpm. The optimum instantaneous primary shaft rpm selection is then supplied to an input terminal of the primary moving device, so as to influence the transmission ratio.

The advantage of the second selection device is that it makes it possible to differentiate between varying degrees of sporting performance. This is done by specifically establishing the required connection between the rpm's of the secondary shaft and the primary shaft. This required connection is preferably established in an electronic manner so that it is not necessary to control the position of the engine throttle by utilizing a certain shape of a cam coupled to the accelerator pedal.

Preferably the transmission according to the present invention is provided with adjustable averaging devices. These averaging devices are connected between the output terminals of the first or the second selection devices and the primary moving device.

An advantage of using adjustable averaging devices is that they reduce the degree of change in the signal carried to the primary moving device. This reduction prevents overly quick variations in the transmission ratio which might otherwise occur. This prolongs the life of the transmission by reducing the amount of wear.

Another aspect of the transmission according to the present invention is that the secondary electronic control system utilizes memory devices to store certain data. The data stored comprise desired motor torque as a function of engine speed for each position of the engine throttle. The control secondary electronic system receives a signal corresponding to the actual position of the throttle and a signal corresponding to the actual engine rpm. The secondary electronic control system includes a processing device connected to the memory device for delivering a further signal corresponding to an estimate of the torque produced by the engine. The secondary moving device controls the tension in the driving belt in response to the signal generated by the processing device in a manner which will be explained later.

The advantage of this aspect of the transmission according to the invention is that the tension in the driving belt is made dependent on the estimated actual torque produced by the engine. Thus, the power can be efficiently transmitted at all times without any slip of the driving belt on the pulley halves.

In order to obtain this latter advantage, the secondary electronic control system comprises a first correction device provided with two input terminals and one output terminal and a first arithmetic unit (FAU) provided with two input terminals and one output terminal. The first input terminal of the FAU is connected to the second input terminal of the processing device on which it receives a signal corresponding to instantaneous engine rpm ($N_m$). The second input terminal of the FAU receives a signal corresponding to the instantaneous primary shaft ($N_p$). The output terminal of the FAU is connected to the second input terminal of the first correction device. The FAU calculates the quotient of $N_p/N_m$ and generates a signal corresponding thereto. The first input terminal of the first correction device is connected to the output terminal of the processing device and receives the $N_p/N_m$ signal generated by the FAU thereon. The first correction device receives a signal corresponding to the estimated instantaneous engine torque which is calculated by the processing device.

At the output terminal of the first correction device a corrected primary shaft torque signal is generated which compensates for any slip. Thus, slip is taken into account when the tension in the driving belt is adjusted. The accuracy of the estimate of the torque of the primary shaft made by the processing device is enhanced by this correction, so that the tension force of the driving belt is adjusted accurately.

Yet another aspect of the transmission according to the present invention is that the secondary electronic control system includes second and third arithmetic units (SAU and TAU). The SAU and TAU each have two input terminal and one output terminal. The SAU receives a signal which corresponds to instantaneous primary shaft rpm ($N_p$). The SAU also receives a signal which corresponds to instantaneous secondary shaft rpm ($N_s$). The SAU computes the transmission ratio i ($i=N_p/N_s$) and generates a signal corresponding thereto to the second input of the third arithmetic unit. The third arithmetic unit (TAU) receives the transmission ratio signal from the SAU. The first input terminal of the third arithmetic unit is coupled to the output of terminal of the first correction device, and the output terminal of the third arithmetic unit is coupled to a terminal of the secondary moving device.

This aspect of the secondary control system makes the tension force in the driving belt dependent on to the instantaneous transmission ratio. This leads to an average decrease of the tension force, thereby prolonging the life of the driving belt.

In yet another aspect of the transmission in accordance with the present invention, the secondary electronic control system includes a fourth arithmetic unit having one input terminal and one output terminal, and a fifth arithmetic unit having two input terminals and one output terminal. The input terminal of the fourth arithmetic unit is connected to the output terminal of the second arithmetic unit. A signal is generated at the output of the fourth arithmetic unit which corresponds to the estimated radius of the secondary pulley ($R_s$). The output terminal of the fourth arithmetic unit is connected to the second input terminal of the fifth arithmetic unit and the first input terminal of the fifth arithmetic unit is connected to the output terminal of the third arithmetic unit.

The advantage of this aspect of the transmission according to the invention is that an estimate may be made for the tension in the driving belt. This estimate is made by utilizing a factor incorporated in the fourth arithmetic unit. The factor utilized depends on the particular dimensions of the secondary pulley halves. The required movement of the secondary moving means to obtain a desired driving belt tension may thus be estimated based on the estimated secondary radius of the driving belt.

Yet another aspect of the transmission in accordance with the invention is that the secondary electronic control system includes a sixth arithmetic unit having one input terminal and one output terminal and a seventh arithmetic unit having two input terminals and one output terminal. The input terminal of the sixth arithmetic unit receives a signal corresponding to the instantaneous secondary pulley speed ($N_s$). The output terminal of the sixth arithmetic unit is connected to the second input terminal of the seventh arithmetic unit and the first input terminal of the seventh arithmetic unit is coupled to the output terminal of the third arithmetic unit. This arrangement reduces the effect, with higher rpm's of the secondary shaft of deviations in the output signal of the seventh arithmetic unit. This is important because the seventh arithmetic unit controls the tension force in the driving belt.

The advantage of this aspect of the transmission according to the invention is that excessive belt tension, which would normally occur at higher speeds, is reduced. In practice, it appears that with higher velocities of revolutions, the tension force of the driving belt can be substantially reduced, as a result of which the amount of wear is further decreased.

BRIEF DESCRIPTION OF THE DRAWINGS

The invention and its further advantages will be further discussed with reference to the drawing, in which.

DETAILED DESCRIPTION OF THE INVENTION

Figure 1:
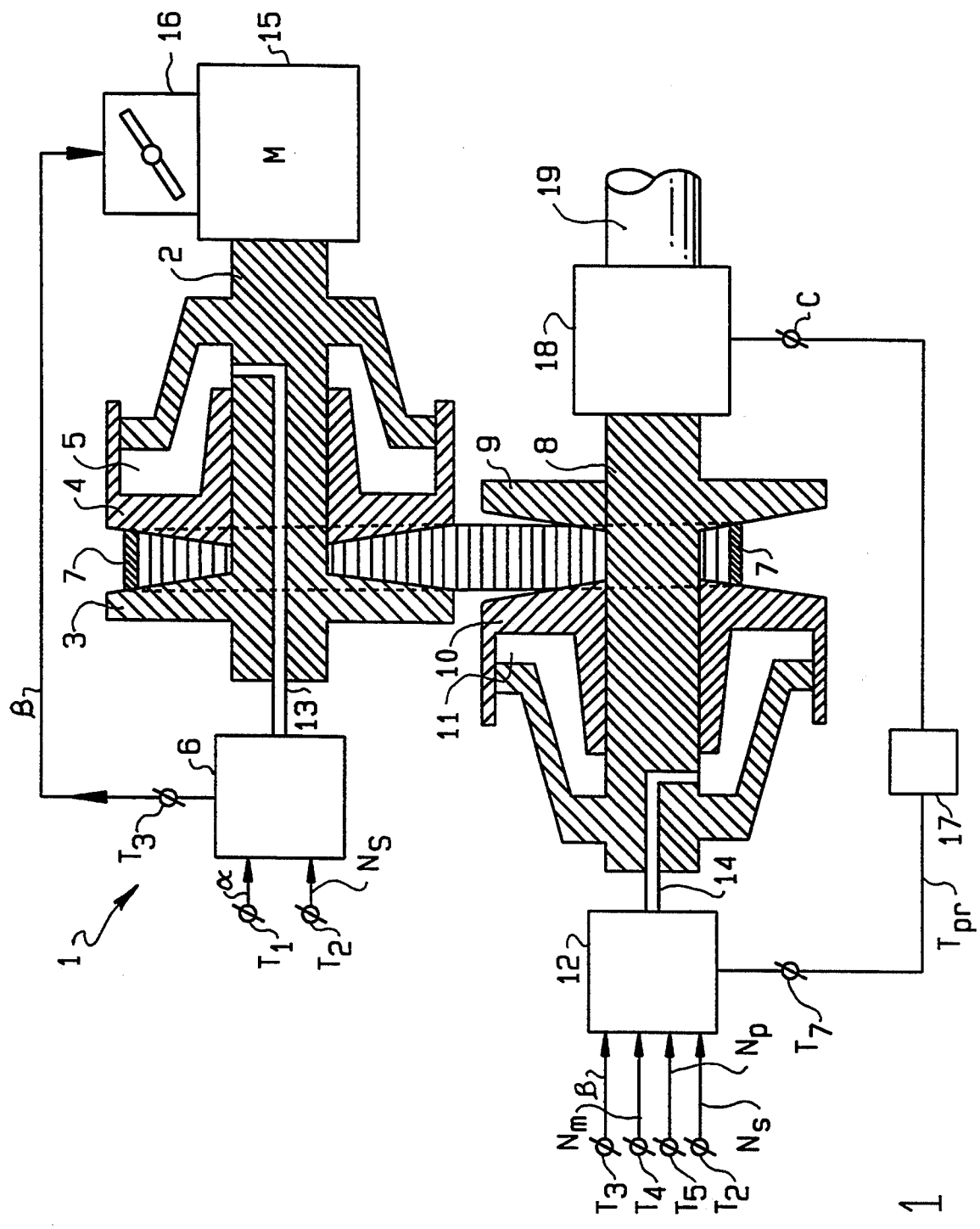
FIG. 1 is a diagrammatic illustration of a preferred embodiment of the electronic continuously variable transmission according to the invention.

FIG. 1 shows the preferred embodiment of an electronic continuously variable transmission system. The transmission system 1 comprises a primary (drive) shaft 2, on which a primary (driving) pulley having conical pulley halves 3 and 4 is mounted. Primary pulley half 3 is fixedly mounted on the primary shaft 2, and primary pulley half 4 is axially movably mounted on the primary shaft 2. The axially movable pulley half 4 is moved by changing the hydraulic pressure in primary chamber 5. The pressure in primary chamber 5 is regulated by a primary control system 6 connected to the chamber 5. The function of the primary control system is to regulate the diameter of the primary pulley by controlling the distance between the pulley halves 3 and 4.

The transmission system 1 further includes a secondary (driven) shaft 8, on which a secondary (driven) pulley having conical halves 9 and 10 is mounted. Secondary pulley half 9 is fixedly mounted on the secondary shaft 8 and secondary pulley half 10 is axially movably mounted on the secondary shaft 8. The secondary pulley half 10 is moved by changing the hydraulic pressure in secondary chamber 11. The hydraulic pressure in secondary chamber 11 is regulated by a secondary electronic control system 12.

The control systems 6 and 12 respectively have moving devices 29 and 74, respectively, which are in fluid connection with the chambers 5 and 11 respectively, by means of lines 13 and 14, respectively. A driving belt is trained over the primary and secondary belt pulleys. Adjustment is made to the tension in the driving belt 7, when the secondary electronic control means 12 changes the pressure in the chamber 11.

It should now be readily apparent that the transmission ratio or the tension force in the driving belt 7, as the case may be, is hydraulically adjusted by the primary or secondary electronic control systems, 6 or 12, respectively. For these adjustments, the control systems 6 and 12 preferably include hydraulic moving devices to be further discussed hereafter. It is understood, however, that pulley halves 4 and 10, which must be moved to adjust the transmission ratio and the tension force, need not be moved using a hydraulic system. For instance, it is conceivable that the moving devices may be of an electro-mechanical design, and for that purpose may comprise electro-mechanical converters. As an example, the electro-mechanical primary and secondary moving devices may contain a rotatable threaded shaft, by means of which the pulley halves 4 and 10 are respectively moved in axial directions. The hydraulic actuators of the preferred embodiment will be explained in more detail hereafter.

The transmission system 1 is preferably installed in a vehicle (not shown) which includes a motor 15 coupled to the primary shaft 2. The motor rpm is controlled by a throttle 16. The vehicle also includes an accelerator pedal (not shown) by which the driver controls the speed of the vehicle. The primary electronic control system 6 receives an electronic signal α corresponding to the instantaneous position of the accelerator pedal via terminal $T_1$.

The transmission system 1 further includes an electronic control unit 17 which is connected to an output terminal of the secondary electronic control system 12. The clutch control unit 17 receives a signal $T_{pr}$ corresponding to an estimate of instantaneous primary shaft torque via terminal $T_7$. An output signal of the clutch control unit 17 is led, via command input terminal C, to a clutch device 18 coupled to the secondary shaft 8. The clutch device 18 transmits the torque delivered by the transmission to the wheels of the vehicle. The clutch device 18 may comprise a conventional clutch or a lock-up torque converter. The clutch device 18 is engaged or disengaged in response to a signal on the command input (C). That signal is derived by the electronic clutch control unit 17 from the $T_{pr}$ signal in a manner which will be described hereafter.

The clutch device 18 is provided behind the secondary pulley, when seen in the driving direction. It will be apparent, however, that within the framework of the invention the clutch device 18 may also be provided in another configuration or at another location in the transmission such as on the primary shaft, without any departure from the scope of the invention.

Figure 2:
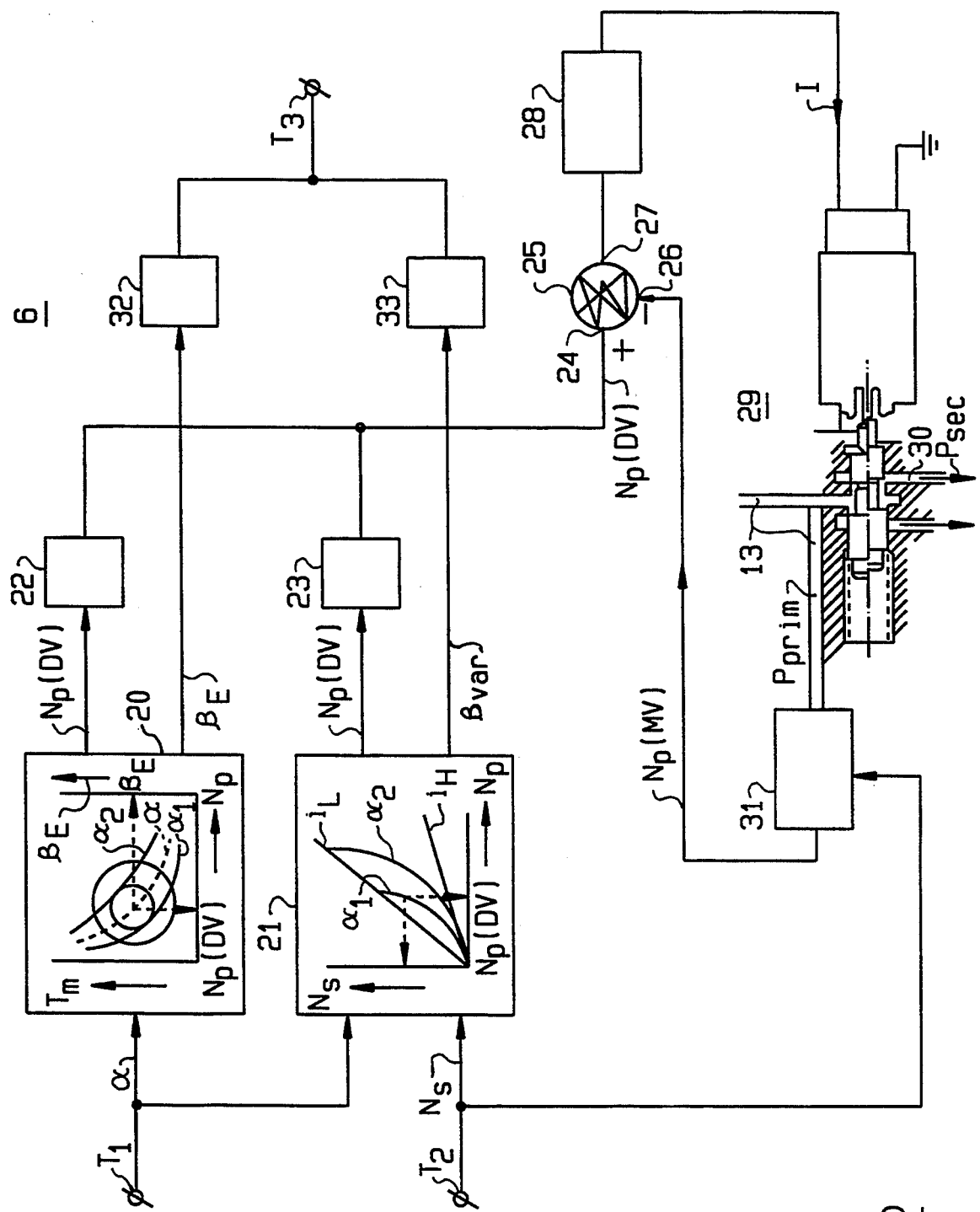
FIG. 2 shows the primary electronic control system for use in the transmission according to FIG. 1.

FIG. 2 shows the primary electronic control system 6 of the preferred embodiment. The control system 6 receives a first input signal α corresponding to the position of the accelerator pedal, and a second input signal $N_s$ corresponding to the instantaneous measured value of the rpm of the secondary pulley. The primary control system 6 includes a first selection device 20 and a second selection device 21. Each selection device is connected, via a respective adjustable averaging device 22 or 23, to the summing input terminal 24 of a conventional summing device 25. The summing device 25 includes an input terminal 26 and a summing output terminal 27 coupled to a conventional Proportional Integral Derivative (PID) controller 28. The PID is connected to the primary moving device 29. The primary moving device 29, which is hydraulically operated in the preferred embodiment, has an ingoing line 30 and an outgoing line 13 through which hydraulic fluid is delivered to a chamber 5. Hydraulic pressure $P_{prim}$ in line 13 is sensed by a converter 31 containing data relating instantaneous values of $P_{prim}$ to instantaneous values of actual instantaneous primary shaft rpm. Converter 31 sends a signal $N_p(MV)$ corresponding to instantaneous primary shaft rpm, based on a corresponding measurement of $P_{prim}$, and the RPM of the secondary shaft 8 from the signal $N_s$ to the input terminal 26 of the summing device 25.

An output signal $N_p(DV)$ corresponding to the desired valve of the primary pulley rpm is generated and transmitted by selection devices 20 and 21 to averaging devices 22 and 23. The processing devices 20 and 21 respectively also generate throttle position signals, $B_e$ and $B_{var}$, respectively, which are received by respective adjustable averaging devices 32 and 33.

Depending upon whether selection device 20 or 21 is in operation, averaging devices 32 or 33 send a respective desired throttle position signal $B_e$ or $B_{var}$ via terminal $T_3$ to a throttle adjustment device (not shown) which controls the size of the throttle opening in response thereto. An output signal $N_p(DV)$ is derived within either of the selection devices 20 or 21 on the basis of the acceleration position signal α in a manner to be further described hereafter. The $N_p(DV)$ output signal corresponds to the desired instantaneous value of the rpm of the primary shaft 2. The $N_p(DV)$ signal is received by the summing device 25 after being passed through averaging device 22 or 23. The averaging devices reduce the variation in the $N_p(DV)$ signal to permit accurate operation of the summing device 25.

Signals $N_p(MV)$ and $N_p(DV)$ are supplied to respective summing input terminals 26 and 24 of the summing device 25. The summation output signal of the summing device 25 represents the difference between the two input signals. The Proportional Integral Derivative (PID)-controller 28 receives the summing device output signal via output terminal 27 of the summing device 25, reduces the steady-drive error and reduces excess frequency response so that the primary moving device 29 can be operated to achieve the desired primary speed in response to the summation output signal received. The primary moving device 29 is operated to change the hydraulic pressure delivered through ingoing line 30 so as to change the hydraulic pressure in line 13. When so operated, the hydraulic pressure in chamber 5 is also changed. The pulley half 4 moves until equilibrium is reached, i.e. until the respective input signals $N_p(MV)$ and $N_p(DV)$ are equal, and the transmission ratio is thereby adjusted.

The first selection device 20 is utilized when minimum fuel economy operation is selected by the user.

The device 20 includes a memory, in which characteristic data are stored. These data comprise the motor torque values for each respective position of the accelerator pedal and the corresponding desired values of instantaneous primary shaft rpm. The characteristic trend of the data is schematically illustrated in block 20. For each position of the accelerator pedal, an area around a desired value of the primary rpm is determined and stored. Within that area, the fuel consumption of the engine is minimal and thus optimal. Around this area, concentric islands of progressively increasing area are determined and stored. These islands represent gradually increasing fuel consumption. From the above data, an optimum selection of the desired instantaneous primary shaft rpm is made in the first selection device 20. Signal Np(DV) is processed by averaging device 22 as described above and supplied to the summation device 25. The summation device compares the signal $N_p(MV)$ and signal $N_p(DV)$ in the manner described above. If they differ, the transmission ratio (i) is changed by the primary moving device 29 until these two values are equal. The first selection device 20 also stores in memory data relating respective values of desired instantaneous primary shaft rpm to corresponding desired positions of the engine throttle. When the transmission is operated according to the first selection device 20, a throttle position adjustment signal $B_E$ corresponding herewith to the instantaneous economical position of the throttle will be determined in accordance with the instantaneous primary shaft rpm selected. Signal $B_E$ is supplied to the terminal $T_3$ via the averaging device 32.

When a normal performance or a sporting performance is required, the second processing device 21 is utilized. The device 21 stores in memory data corresponding to a predetermined relationship between the actual instantaneous secondary shaft rpm and the desired instantaneous primary shaft rpm for respective positions of the accelerator pedal. For sporting performance, the desired relationship is preselected to maximize acceleration. This relationship is schematically illustrated in block 21 and lies between extreme values of the transmission ratio i. The desired relationship is dependent on the manner in which the secondary shaft rpm varies and on the manner in which the corresponding desired instantaneous primary shaft rpm varies. The instantaneous secondary shaft rpm is derived from a signal $N_s$ received by the second processing device 21 via terminal $T_2$. Signal $N_s$ is generated by a conventional device (not shown) for measuring rotational speed. The desired instantaneous primary shaft rpm is selected on the basis of the instantaneous secondary shaft rpm and the position of the accelerator pedal in accordance with the stored data.

A signal $N_p(DV)$ corresponding to the desired instantaneous primary shaft rpm determined by the second selection device 21 is sent to averaging device 23. Operation of the primary moving device 29 in response to the $N_p(DV)$ signal produced by the second selection device is identical as that described in connection with the first selection device 21.

The second processing device 21 also stores in memory data representing the desired relationship between desired instantaneous primary shaft rpm and the corresponding necessary throttle adjustment. Signal $B_{var}$ corresponding to the necessary throttle adjustment is supplied to terminal $T_3$ via the averaging device 33.

The manner in which the operating mode of the transmission is selected, by selecting the first selection device 20 or the second selection device 21 may take place automatically or manually. In an automatic operation, it may be provided that when the accelerator pedal is maintained in a constant position, an automatic selection is made for the first selection device 20. Then, in the case of a "kickdown" on the accelerator pedal, the option of a normal or a sporting performance may automatically be selected by operating the second selection device 21. Provision in an automatic operation may also be made for normal or sporting performance as a default with an available, manually initiated fuel economy option.

Within the framework of the primary control system it is also possible to obtain a constant transmission ratio. The second processing device will include stored data making it possible to select such an instantaneous primary shaft rpm for a given secondary shaft rpm that a constant transmission ratio is maintained. This is a desirable addition, in particular when the transmission is used in vehicles. The driver of the vehicle would thereby have an option to select a desired transmission ratio i which is constantly maintained by the second selection device 21, in that case by constantly varying the value of $N_p(DV)$.

If required and necessary in practice, the various set constants and time constants in the PID-controller 28 can be modified depending on whether the first or the second selection device is selected in accordance with the degree to which responsiveness is required. Possibly, various actions in the controller 28 can be made dependent on the magnitudes of the signals $\alpha$, $N_s$, $N_p(DV)$, $B_E$ or $B_{var}$. The controller 28 may even be self-learning.

Figure 3:
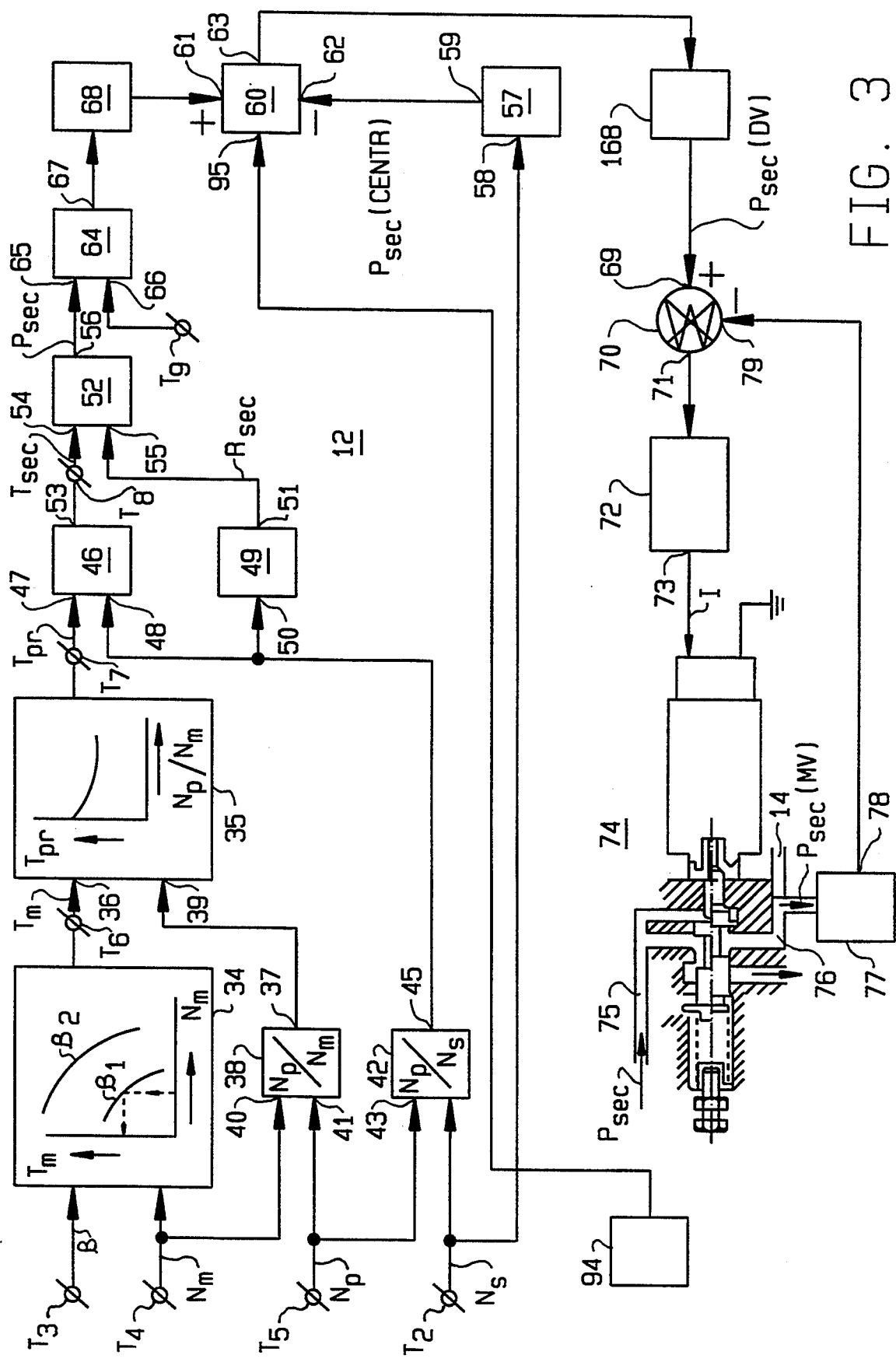
FIG. 3 shows the secondary electronic control system for use in the transmission according to FIG. 1.

FIG. 3 shows the preferred arrangement of the secondary electronic control system 12. The control system 12 includes processing device 34 having an input connected to the terminal $T_3$ and an input connected to the terminal $T_4$. Via terminal $T_3$, device 34 receives throttle position signal $B_e$ or $B_{var}$, and via terminal $T_4$, device 34 receives a signal $N_m$ corresponding to instantaneous measured engine speed. The device 34 also has an output connected to terminal $T_6$.

The control system 12 further includes a first correction unit 35. First correction unit 35 has a first input 36 connected to the terminal $T_6$ and a second input 39 connected to an output 37 of a first arithmetic unit 38 (FAU). Unit 38 has a first input 40 connected to the terminal $T_4$ and a second input 41 connected to the terminal $T_5$. Unit 38 receives signal $N_m$ via terminal $T_4$ and a signal $N_p$ corresponding to instantaneous primary shaft rpm via terminal $T_5$. Unit 38 generates an output signal, which corresponds to the quotient of $N_p$ and $N_m$, to input 39 of the first correction device. This quotient indicates the extent of any slip that occurs, when a reduction device (not shown) are provided between the motor 15 and the primary shaft 2. This quotient will generally be smaller than 1.

The secondary control system 12 further includes a second arithmetic unit 42 having a first input 43 connected to the terminal $T_5$ and a second input 44 connected to a terminal $T_2$. The second arithmetic unit has an output 45, from which a signal corresponding to the transmission ratio, which is defined as the quotient of $N_p$ and $N_s$ is sent. A third arithmetic unit 46 has two inputs 47 and 48. Input 47 is connected to the terminal $T_7$ and input 48 is connected to the output 45 of the second arithmetic unit 42. Furthermore, the control system 12 includes a fourth arithmetic unit 49 and a fifth arithmetic unit 52. The fourth arithmetic unit has an input 50 connected to the output 45 and an output 51, from which a signal $R_{sec}$ corresponding to the estimated radius of the secondary pulley is sent. The fifth arithmetic unit 52 has a first input 54 connected to terminal $T_8$. Terminal $T_8$ is connected to an output 53 of the third arithmetic unit 46. A second input 55 of unit 52 is connected to the output 51 of the fourth arithmetic unit 49. Within the fifth arithmetic unit 52, a signal $P_{sec}$ is generated, in a manner to be explained hereafter, which corresponds to the estimated pressure, in outgoing line 14, needed to adjust the pressure in chamber 11. As will be more fully explained, the tension in the driving belt 7 is controlled by adjusting the pressure in the chamber 11 in accordance with the $P_{sec}$ signal.

Secondary electronic control system further includes a sixth arithmetic unit 57 and a seventh arithmetic unit 60. 12. Unit 57 has an input 58 and an output 59, and unit 60 has a first input 61, a second input 62, and an output 63. The input 58 is connected to the terminal $T_2$, the second input 62 is connected to the output 59 and the first input 61 is coupled to the output 56 of the fifth arithmetic unit 52, via an eighth arithmetic unit 64 incorporated in the control system 12. The eighth arithmetic unit 64 has a first input 65 connected to the output 56, a second input 66 and an output 67. An adjustable averaging device 68 is provided between the output 67 and the input 61.

The aforesaid adjustable averaging devices 22, 23, 32, 33, as well as the adjustable averaging device 68, each contain electronic means, on the basis of which an amplitude variation in the input signal is reduced. In general, the reduction in a rising gradient of the input signal will be different from a reduction with regard to a decreasing gradient in the input signal in question. The output 63 of the seventh arithmetic unit may be coupled, via an adjustable limiter 168, to an input 69 of a summing device 70.

The summing device 70, which has two inputs 69 and 79 and one summing output 71, forms part of a control loop, The control loop incorporates a PID-controller 72 which receives a summing output signal at input 71 and which has an output 73 connected to the secondary moving device 74.

The moving device 74 is provided with an ingoing line 75 coupled to a pump (not shown) and outgoing lines 76 and 14. The pressure in the line 76 is adjusted in response to the summation output signal generated by the summation device 70 as will be more fully described hereafter. Line 76 is connected to a converter 77, which has an output 78 connected to input 79 of the summing device 70.

The converter 77 effects a conversion of the hydraulic pressure in the outgoing line 76 into a signal $P_{sec}(MV)$ on the output 78. $P_{sec}(MV)$ represents is the measured value of the pressure in the chamber 11. The converter signal $P_{sec}(MV)$ is processed as a summing input by the summing device 70. The tension force in the driving belt 7 is maintained in accordance with the signals $\alpha$, $N_m$, $N_p$ or $N_s$. Also the actions in the PID-controller 72 are adjusted such that they ensure an optimum and stable influencing of the pressure $P_{sec}(MV)$.

The starting point in the operation of the secondary electric control system 12 is the data stored in the memory of the control system. That data comprises the values of engine rpm associated with the motor torque values of the engine rpm, for each possible setting of the engine throttle 16. On the basis of the signals B and $N_m$, (corresponding to throttle position and engine speed, respectively) an estimate in made of the torque produced by the engine. The estimate is supplied as signal $T_m$ to the input 36. Block 34 diagrammatically illustrates the relevant characteristics that play a role within this context.

On the basis of data stored in a memory of the first correction unit 35, which data comprise the relationship between estimated instantaneous primary shaft torque and the transmission ratio between the engine and the primary shaft, an estimate is made of instantaneous primary shaft torque. A signal $T_{pr}$, which corresponds to that estimate, is supplied to the input 47. On the basis of the signal $T_{pr}$ and on the basis of the signal supplied to the second input 48, which contains a measure for the transmission ratio between the pulleys, the product of $T_{pr}$ and i is determined in the third arithmetic unit 46. The product of $T_{pr}$ and i, which is the estimated instantaneous secondary shaft torque, is supplied to the input 54 as signal $T_{sec}$. On the basis of the relation $p=T/(2)(\mu)(R)A_s$, where P is the desired pressure in line 14, T is the estimated secondary shaft torque, $\mu$ is the coefficient of friction between the secondary shaft and pulley half 10, R is the average radius of the secondary pulley, and $A_s$ is the effective surface area of the pulley half 10 against which fluid force is exerted, a computation is carried out in the fifth arithmetic unit 52. This computation, the result of which is supplied as signal $P_{sec}(DV)$ to the input 65, represents the desired pressure in line 14 based on the estimated values of the radius of the secondary pulley and secondary shaft torque.

To the second input 66 of the eighth arithmetic unit 64 a signal is supplied from terminal $T_9$ which corresponds to a reserve safety pressure, for example, 2 bar, which in the arithmetic unit 64 is added to the signal on the input 65 and which is then supplied to the input 61 of the seventh arithmetic unit 60 via the adjustable averaging device 68.

To the second input 62 of seventh arithmetic unit 60 a signal $P_{sec}(CENTR)$ is supplied. The signal $P_{sec}(CENTR)$ corresponds to an estimate of centrifugal pressure, which is due to centrifugal forces on the fluid in the rotating secondary pulley. The estimate of centrifugal pressure in the secondary pulley is determined by the sixth arithmetic unit 57 from the signal $N_s$ supplied thereto via terminal $T_2$. Unit 57 calculates centrifugal secondary pressure on the basis of the relation $P=C[(N)^2/1000]/A$, where P is the estimated fluid pressure due to centrifugal force, c is a constant, N is instantaneous secondary shaft rpm, and A is the effective inside surface area of secondary pulley half 10 on which the pressure in the secondary moving device is exerted.

The arithmetic unit 60 subtracts the signal on the input 62 from the signal on the input 61, the difference being supplied to the output 63. On account of the quadratic relation with regard to $N_s$, the pressure due to centrifugal force will play an important role, in particular with higher secondary rpm's of the shaft 8. Eventually a desired secondary pressure signal $P_{sec}(DV)$ is supplied to the summing device 70. For safety reasons the circuit will be arranged in such a manner that when the signal on the output 73 is zero the secondary pressure will be maximal, in order that, irrespective of a possible failure in the functioning of the control means 12, the tension of the driving belt is controlled such that the functioning of the transmission 1, be it not optimal, is ensured.

Figure 4:
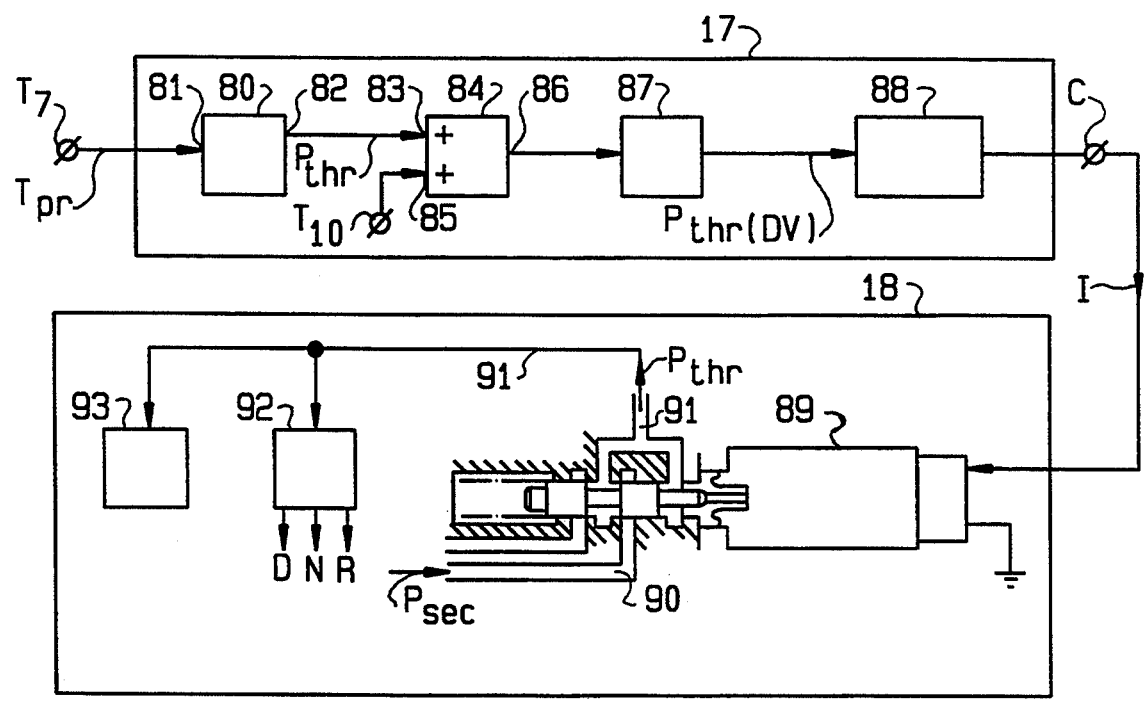
FIG. 4 shows further electronic control features for use in the transmission according to FIG. 1.

FIG. 4 shows the possible arrangement of the further electronic control system 17, and a part of the clutch unit 18. The further electronic control system 17 includes a ninth arithmetic unit 80 having an input 81 connected to the terminal $T_7$ and an output 82. If clutch unit 18 is a fluid clutch, the arithmetic unit 80 computes on the basis of the relation $P_{thr}(\text{slip}) = T_{pr}/\mu AnR$), wherein:

$P_{thr}$ is the hydraulic pressure required for operating the clutch/lock-up device 18;

$\mu$ is the coefficient of friction between the clutch plates;

A is the surface area of the clutch plate;

n indicates the number of plates; and

R indicates the average radius.

The output 82 is connected to a first input 83 of a tenth arithmetic unit 84. The tenth arithmetic unit also has a second input 85 connected to terminal $T_{10}$ and an output 86. The signal received at input 85 represents a compensating pressure signal which is added to a signal corresponding to the desired clutch pressure on the input 83. The sum representing the compensated value of desired clutch pressure is made available to the output 86. The output 86 is coupled to the terminal (C) via adjustable averaging device 87 (if present) and a converter 88. Converter 88 converts the signal corresponding to the desired clutch operating pressure into a signal $P_{thr}(DV)$ which is suitable for influencing a valve 89 incorporated in the clutch/lockup device 18. The converter 88 will generally be provided with a suitably adjustable PID-controller for that purpose. The valve 89 has an ingoing line 90 in which a hydraulic pressure $P_{sec}$ is maintained by a pump (not shown) and an outgoing line 91 in which a pressure adjusted by the further electronic control system 17 is delivered to a valve 92. Valve 92 is preferably manually controlled, with the user selecting among "drive", neutral and "reverse" modes. The signal $P_{thr}$ may also be used for engaging a clutch/torque converter 93. If required, the engagement of the clutch/torque converter 93 may be made dependent on the operating mode connected with the "economical", "normal" or "sporting" driving style. With each of the selected driving styles the engagement of the clutch/lock-up of the torque converter 93 can be made dependent on certain requirements being met by the aforesaid parameters or on a combination of the aforesaid parameters. The engagement may be made dependent on certain limits being exceeded, or the reverse, by the parameters or the parameter combinations. Examples of parameters or parameter combinations include: a, da/dt, i., $N_s$, $N_p$, $N_m/N_p$, $dN_s/dt$ or for example the temperature of the brakes or the slip torque of the belt. Also the limiting values may be made dependent on the specific operating mode which is required.

If desired, the value 89 may be incorporated in a control loop wherein the line 91 is connected to a converter (not shown) which is in turn connected to a summing device (not shown) connected between the adjustable averaging device 87 and the converter 88. Such a control arrangement would match the actual $P_{thr}(MV)$ clutch pressure with the desired clutch pressure.

The previously explained memories in the devices 20, 21, 34 and 35 may be provided in the form of a rom, prom, an E-prom or an EE-prom.

The electronically controlled continuously variable transmission explained above may be easily modified into an even more advanced transmission. It is possible, for example, to supply suitable signals to the secondary electronic control system 12. These signals would include a measure for any torque variations caused by the motor or upcoming road conditions. Such torque variations may cause undesirable slip of the driving belt 7 across the pulleys. This undesirable slip may be avoided before the torque variations reach the transmission by suitable adjustments to the secondary pressure. To initiate such adjustments, it is necessary that the impending torque variations be recognized at an early stage. It is possible to anticipate the torque variations caused by the motor when the motor torque field of the motor used is known. This motor torque field can be stored in the device 34 and used in the system shown in FIG. 3 to adapt the secondary pressure in response to a given variation in the position of the throttle and the change of the motor torque connected therewith. During a normal operation of the transmission in various operating situations, such as "low", "medium" or "overdrive", it appears that depending on the kind of operating situation, the sensitivity to and negative effect of motor torque variations varies. The sensitivity to the transmission for motor torque variations is greatest in the "low" position. The secondary electronic control system 12 may thus be arranged in such a manner that this fact is taken into account, so that the tension in the driving belt 7 is at all times optimally adapted to the torque to be transmitted. In practice such motor torque variations appear to be well-predictable from the moment the accelerator pedal is depressed. The time that lapses between the moment of acceleration and the moment at which the motor torque is built up generally amounts to a few tens of milliseconds. Another few tens of milliseconds later the torque of the primary shaft 2 is equal to that of the motor.

On the other hand, torque variations which are caused by the road conditions are unpredictable and therefore some form of detection is required, in order to be able to supply data to the various control means that contain a measure for the torque variations resulting from this. Some indicators which may be used to detect variations caused by road conditions include:

a) the torque occurring in the secondary shaft 8;

b) the torsional rotation of the secondary shaft 8;

c) the angular rotation of the wheels of the vehicle;

d) the vertical (springing) movement of the wheels;

e) the vertical bearing forces occurring in the wheel bearings in question.

The above indicators are in principle usable, but they provide measurements substantially simultaneously with the occurring torque variations. Possible measurements may anticipate upcoming torque variations in the transmission include:

a) the deformation of the tires, which may be determined by means of strain gauges detecting the deformation of the rubber of the tires so as to detect unevenness in the road surface;

b) the air pressure in the tires;

c) the horizontal bearing forces in the wheels;

d) the reaction forces in the various supporting arms and reaction rods.

Information that anticipates torque variations even further is provided by measuring the unevenness of the road surface by means of microwaves or laser-doppler sensors. Such sensors are blank contact transducers which are already used with active suspension systems. Because the information provided by road surface sensors anticipates so far ahead, ample computing time and control time is available so as to have the secondary pressure adjusted at the corrected moment. It appears that even at a speed of 100 km/h a period of about 18 milliseconds is still available. A sensor 94 of the type explained above is schematically indicated in FIG. 3. In the illustrated embodiment of the secondary electronic control system 12, sensor 94 is connected to a third input 95 of the seventh arithmetic unit 60, so as to influence the secondary pressure additionally by means of the signal on the third input. A computation may be made in the sensor 94, on the basis of the instantaneously available data as to possibly occurring torque variations. Where torque variations might lead to impermissible slip, the secondary pressure might be adjusted instantaneously in order to reduce or eliminate the impermissible slip.

Figure 5:
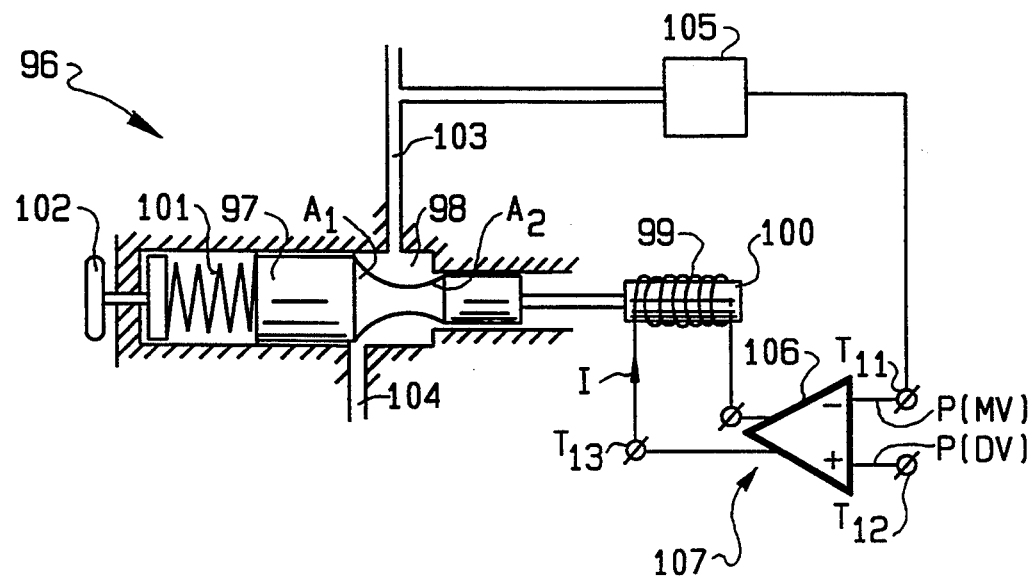
FIG. 5 shows a preferred electro-mechanical moving device for use in the transmission according to FIG. 1.

The electro-mechanical means explained above with reference to FIGS. 2, 3 and 4, viz. the primary moving device 29, the secondary moving device 74 and the valve 89 may, as already said before, be of electro-mechanical design. A preferred embodiment of an electro-mechanical moving device is generally identified by reference numeral 96 and is illustrated in FIG. 5. The device 96 illustrated in this embodiment comprises a valve body 97, which is axially movable within a chamber 98 under the influence of a movable core 100 accommodated in a coil 99. The valve body 97 bears against a spring 101, whose bias can be determined by an adjusting screw 102. The construction of the valve body 97 is such that the valve body narrows in the chamber 98 from an effective surface $A_1$ to an effective surface $A_2$. Surface $A_2$ is smaller than $A_1$. Lines 103 and 104 terminate in the chamber 98. Fluid passage through these lines may be controlled by moving the valve body 97. A pump (not shown) may be connected to the line 103, whereby the line 104 can be used as a blow-off for the fluid to be delivered by the pump. By driving the coil 99 it is possible to change the axial position, and thus the passage openings. A pressure is thus effected in the line 103 which is dependent on the current through the coil 99. If a fluid pressure is present in the chamber 98, a net force against the force of the spring 101 will co-operate with the force exerted by the coil 99, and the position of the valve body 97 will be shifted until an equilibrium of forces is reached. The net force produced by the hydraulic pressure in the chamber 98 works against the spring pressure because the effective surface A1 is larger than the effective surface A2. Thus, the hydraulic pressure in the chamber 98 is used to assist the action of the coil 99. The electro-mechanical moving device 96 thus functions as a direct converter of the electric current I into a required hydraulic pressure. A conventional pilot valve or an auxiliary valve would be redundant as a result of this direct control method and is therefore not required.

The electro-mechanical moving device 96 will be incorporated in a control loop designed to reduce its sensitivity to any effect that the pressure in the chamber 98 has on control. To this end, a converter 105 is connected to the line 103 for converting the hydraulic pressure in the line 103 into a corresponding electric signal P(MV) being present in the control loop. The control loop further includes a summing device 106 receiving two input signals, viz. P(MV) and P(DV), at terminals $T_{11}$ and $T_{12}$, respectively. The output 107 of the summing device 106 is connected to coil 99 via terminal $T_{13}$. As long as the summing device detects a difference signal between the measured value P(MV) signal and the required value P(DV) signal, the summing device will effect a current through the coil 99 so as to move the valve body 97, until an equilibrium has been reached and both signals are equal to each other.

A very important advantage from a point of view of safety is that, in the unlikely event of a power failure, the electro-mechanical moving device 96 automatically assumes a position, under the influence of the spring, in which a safe high pressure is set. Thus, the transmission keeps functioning in spite of the power failure.

A high pressure might be undesirable for a prolonged time because it might result in damage to the transmission. Therefore, the electro-mechanical moving device may be designed such that in the event of a power failure a constant lower pressure is set. Besides the electro-mechanical moving device, additional control means may be provided which act only in the event of a power failure to set the high or low pressure adjusted by the electro-mechanical means to a required pressure level. Two possible embodiments are illustrated in FIGS. 6 and 7.

Figure 6:
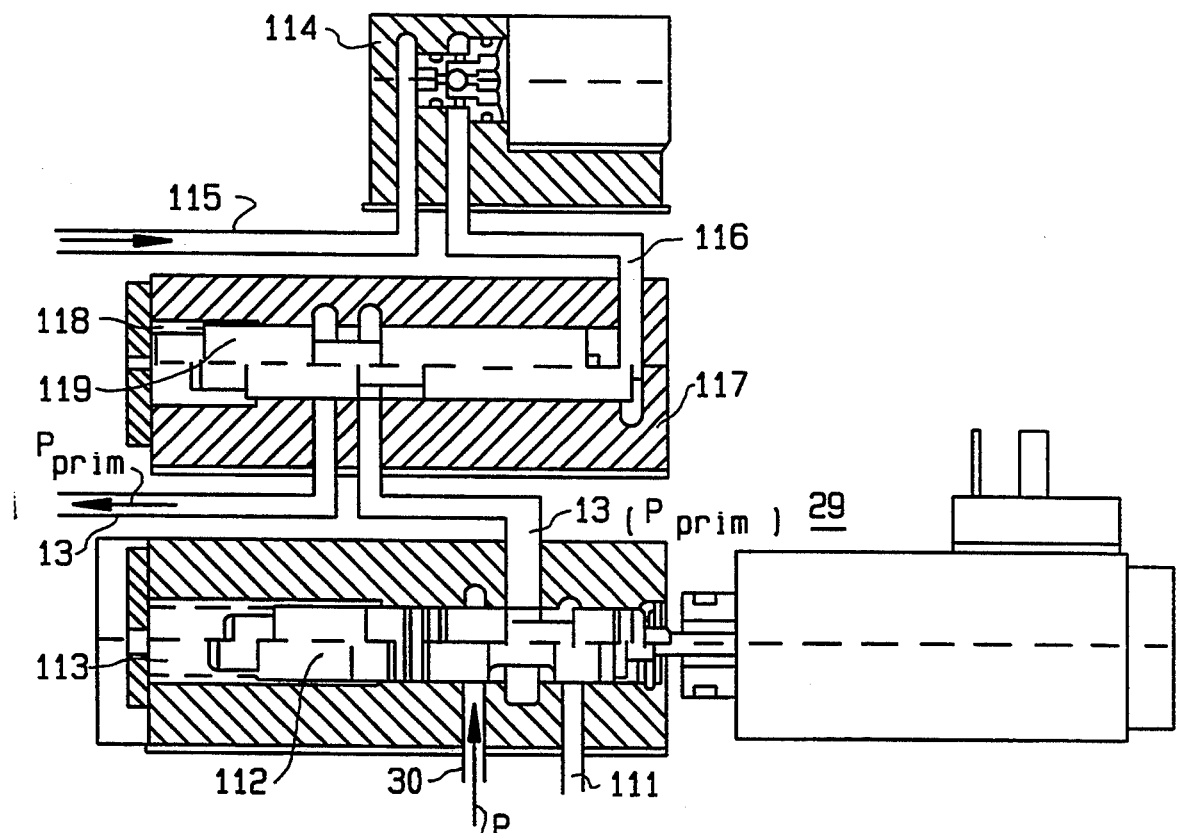
FIG. 6 shows a further embodiment of primary electro-mechanical moving device incorporating a safety valve for use in the transmission according to FIG. 1.

FIG. 6 shows primary electronic control system 6 which, insofar as it corresponds with FIG. 2, has been given the same numerals. The primary moving device 29 is again in the form of a hydraulic moving device and has an ingoing line 30 with a pressure $P_{sec}$ and an outgoing line 13 with the set pressure $P_{prim}$. A hydraulic medium can be discharged via an outgoing line 111. In the event of a power failure, the valve body 112 will move to the right under the influence of the spring 113, as a result of which the ingoing line 30 is no longer in contact with the ingoing line 13. There is a connection between the line 13 and the line 111, so that the hydraulic medium will flow from the line 13 via the line 111. As a result of this connection, pressure $P_{prim}$ in the line 13 would quickly become lower in the event of a power failure. As a result, the transmission would change down very quickly and the rpm would run up very fast. This is undesirable and is preferably avoided. For this purpose, the control according to FIG. 6 is furthermore provided with an on/off solenoid 114 and a safety valve 117. The safety valve 117 is provided in the line 13. The on/off solenoid 114 is provided with an ingoing line 115 and an outgoing line 116, which is coupled to the safety valve 117. In the event of a power failure, the on/off solenoid 114 closes the passage of hydraulic medium between the lines 115 and 116. As a result of this closing, the control signal in the line 116 to the safety valve is blacked out. Under the influence of the spring 118, the valve body 119 of the safety vale 117 will move to the right, so that the line 13 is closed. As a result pressure $P_{prim}$ in line 13 cannot become lower in the event of a power failure, except for a slight leakage in the control system, which is common. As a result of any leakage, pressure $P_{prim}$ will decrease only slowly, the transmission will change down gradually, and the engine rpm will also run up slowly. The driver will notice this and will have sufficient time to decelerate. Thus a safe primary electronic control is obtained even in the event of a power failure.

Figure 7:
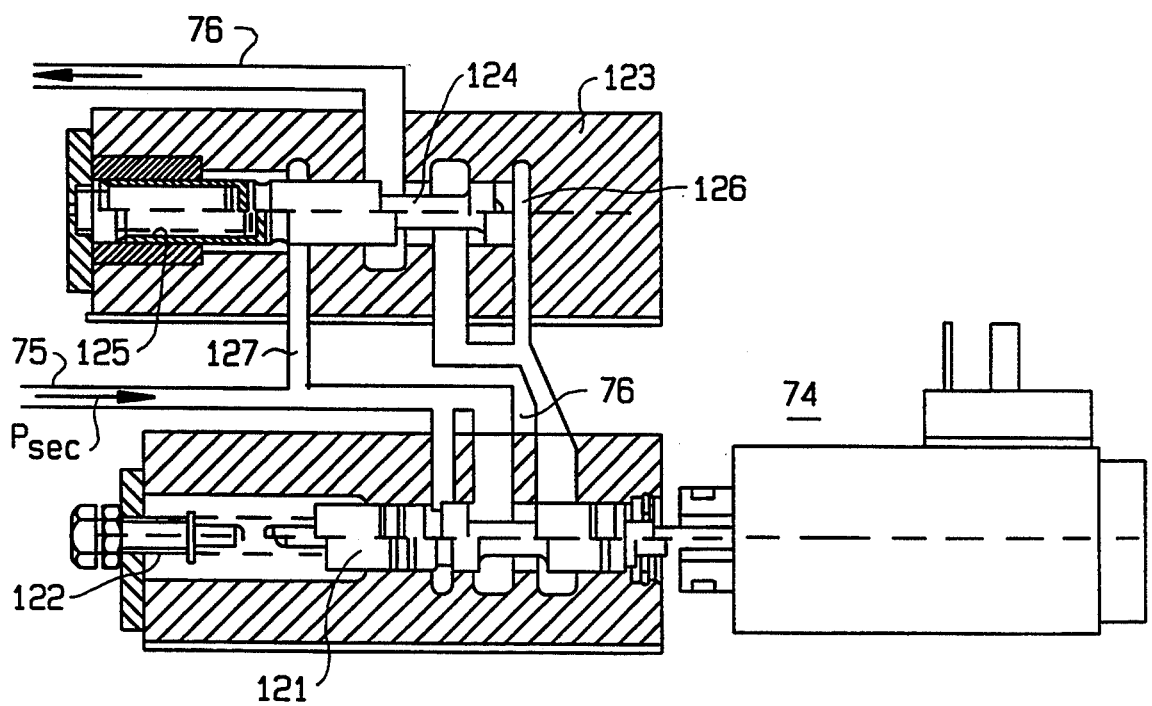
FIG. 7 shows a further embodiment of a secondary electro-mechanical moving device incorporating a safety valve for use in the transmission according to FIG. 1.

FIG. 7 shows the secondary electronic control system 12 which insofar as it corresponds to FIG. 3, has been given the same numerals. The secondary moving device 74 is provided with an ingoing line 75 which is coupled to a pump (not shown) and with an outgoing line 76. In this case, the moving device 74 is designed such, that in the event of a power failure, the opening connecting the ingoing line 75 and the outgoing line becomes maximal. Specifically, in the event of a power failure, the valve body 121 is completely pushed to the right in FIG. 7 under the influence of the spring 122. Pressure $P_{sec}$ is set to a safe pressure in the line 75, as a result of the large discharge of the hydraulic medium via the line 76. In order to make it possible for the transmission to be driven even in the event of a power failure, a hydraulic auxiliary valve 123 is provided in the discharge line 76. Auxiliary valve 123 has a valve body 124 and a spring 125. Furthermore, the pressure of the discharge line 76 acts on the valve 124 at 126. The pressure of the discharge line 76 at 126 acts against the spring 125. The spring 125 is supported again at 127 by the pressure $P_{sec}$ in the line 75.

With normal use, $P_{sec}$ at 127 will always be larger than the pressure in the discharge line 76 at 126 so that under the influence of the spring 125, the valve body 124 shown on FIG. 7 is mainly directed towards the right. Thus, the valve body 124 will at all times allow a certain flow of hydraulic medium through the line 76. In the event of a power failure, the pressure in the line 76 and at 126, will increase, as a result of which the valve 124 of FIG. 7 will move to the left to further control the flow in the line 76 and thus also $P_{sec}$ in the line 75. The auxiliary valve 123 then assumes the control of $P_{sec}$ in the event of a power failure, and sets it to such a low value that the transmission and the vehicle can be driven, but that the transmission is not loaded by high pressure, which might lead to damage.

It will be apparent that within the framework of the invention several other embodiments for electro-mechanical devices are conceivable. Thus the electro-mechanical device may be provided with several supply and/or discharge lines, as well as with control edges. Further, the valve body 97 itself may also serve as a core for the coil 99.

With the electro-mechanical device, in particular those wherein the valve body is directly connected to the core of the coil or wherein the valve body itself functions as a core, instability of hysteresis may occur when the coil is driven with a certain current. According to the invention, however, this can be largely prevented by providing a dither frequency on the current.

In the event of large changes in the required control current, e.g. by braking of the vehicle, the control may furthermore be self-learning, in such a manner that the driving current, without control steps, is directly taken to the required value, after which the control takes over the current adjustment.

We claim:

1. In a continuously variable transmission for transmitting the power of an internal combustion engine having a throttle valve and an accelerator pedal, the transmission having a primary pulley including a shiftable primary disk and a first moving means for shifting the primary disk, a secondary pulley including a shiftable secondary disk and a second moving means for shifting the secondary disk, and a belt engaged with both pulleys, the improvement comprising:

first selection means for operating said transmission in a first performance mode, said first selection means being adapted to operate said first moving means to obtain a primary pulley radius associated with a desired primary shaft rpm value in accordance with said first performance mode;

first fluid pressure control means comprising a first chamber, a first valve body axially movable within said first chamber, a first fluid passageway communicating with said first chamber for permitting introduction of fluid thereinto from a fluid source, another first fluid passageway communicating with said first chamber for permitting fluid therein to exit therefrom, and a first coil having a first movable core which is connected to said first valve body, wherein the position of said first valve body is changed by applying current to the coil to control the pressure level of fluid in said another first passageway to control said first moving means; and first standby means operatively connected between said another first passageway and said first moving means for controlling the fluid pressure in said another first passageway in the event of a power failure to retain pressure with only a gradual pressure loss.

2. A transmission according to claim 1, further comprising:

a second selection means for operating said transmission in a second performance mode, said second selection means being connected to receive said accelerator pedal position signals and being adapted to operate said first moving means to obtain a primary pulley radius associated with a desired primary shaft rpm value in accordance with said second performance mode; and means for selecting between said first selection means and said second selection means.

3. A transmission according to claim 1, further comprising second fluid pressure control means including a second chamber, a second valve body axially movable within said second chamber, at least one second fluid passageway communicating with said second chamber for permitting introduction of fluid thereinto from said fluid source, another second fluid passageway communicating with said second chamber for permitting fluid therein to exit therefrom, and a second coil having a second movable core which is operatively associated with said second valve body, wherein the position of said second valve body is changed by applying current to said second coil to control the pressure level in said another second passageway to control said second moving means, and a second standby means operatively connected to said fluid source and between said second moving means and said another second passageway for controlling the fluid pressure provided to said second moving means in the event of a power failure to provide an open communication between said fluid source and said another second passageway.

4. A transmission according to claim 3, wherein said primary pulley further includes a fixed primary disk and wherein said first moving means comprising said shiftable primary disk which forms a primary chamber that communicates with said first chamber via said first standby means.

5. A transmission according to claim 4, wherein said secondary pulley further includes a fixed secondary disk and wherein said second moving means comprises said shiftable secondary disk which forms a secondary chamber that communicates with said second chamber via said second standby means.

6. A transmission according to claim 3, wherein said first core is connected to said first valve body and said second core is connected to said second valve body.

7. A transmission according to claim 6, wherein each of said first and second valve bodies has at least one surface within its respective chamber to which fluid in the respective chamber exerts a hydraulic force to change the position of each valve body.

8. A transmission according to claim 7, wherein said first and second moving means each comprise biasing means operatively associated with its respective valve body to bias said valve bodies against said hydraulic force.

9. A transmission according to claim 3, wherein said first and second moving means each include means associated with each coil for providing a dither frequency in the current.

10. A transmission according to claim 5, wherein said first standby means comprises a first standby valve having a first standby passageway and another first standby passageway, said first standby passageway being connected in series with said another first standby passageway to establish fluid communication from said first standby passageway to said another first standby passageway during normal operation, said another first standby passageway being connected to said first primary chamber for fluid communication therewith; and means for blocking said primary chamber in the vent of a power failure by closing fluid communication between said another first standby passageway and said another first standby passageway to substantially retain the fluid pressure in said primary chamber, with only a slight normal fluid leakage which decreases the pressure gradually.

11. A transmission according to claim 10, wherein said means for blocking said primary chamber comprises an on/off solenoid connected between said first standby passageway and said another first standby passageway to open and close communication therebetween.

12. A transmission according to claim 5, wherein said second standby means comprises a second standby valve having a plurality of second standby fluid passageway and another second standby fluid passageway, said another second standby passageway being connected to said secondary chamber for fluid communication therewith, and one of said second standby passageways and said second passageway being in fluid communication with said fluid source, and rest of said second standby passageways being connected to said another second passageway, wherein fluid communication is established from said second passageway to said another second passageway to said rest of second standby passageways to said another second standby passageway to said secondary chamber during normal operation, and whereupon in the event of a power failure, fluid communication is established from said one second standby passageway to said another second standby passageway, completely bypassing said second chamber to maximize fluid communication.

13. A transmission according to claim 3, wherein said second pressure control means controls the tension of said belt.

14. A transmission according to claim 1, further comprising adjusting means for positioning said throttle valve, wherein said first selection means comprises a memory means containing data corresponding to desired positions of the throttle valve for respective positions of said accelerator pedal, wherein said adjusting means is connected to said throttle valve to obtain a desired position of the throttle valve based on the position of said accelerator pedal.

15. An electronically controlled continuously variable transmission for use in a vehicle having an engine, a throttle valve, and an accelerator pedal coupled to said throttle valve, said transmission comprising:

a driving means including a primary shaft connected to said engine, a primary pulley mounted on said primary shaft, and first moving means for changing the radius of said primary pulley, wherein said primary pulley includes primary pulley halves of which at least one of the primary pulley halves is axially movable and said first moving means is operatively connected to said movable primary pulley half for shifting said movable primary pulley half along said primary shaft relative to said other primary pulley half;

a driven means including a secondary shaft, a secondary pulley mounted on said secondary shaft, and second moving means for changing the radius of said secondary pulley, wherein said secondary pulley includes secondary pulley halves of which at least one of the secondary pulley halves is axially movable and said second moving means is operatively connected to said movable secondary pulley half for shifting said movable secondary pulley half along said secondary pulley shaft relative to other secondary pulley half;

a driving belt drivingly connecting said primary pulley and said secondary pulley;

a primary electronic control means for operating said first moving means, said primary electronic control means being operatively connected to said first moving means and including a first selection means for operating said transmission in a selected operation mode, wherein said first selection means is connected to receive signals corresponding to instantaneous positions of said accelerator pedal, wherein said first selection means includes a memory containing first data corresponding to predetermined instantaneous engine torque values and desired instantaneous primary shaft rpm values for respective positions of said accelerator pedal, wherein for each respective accelerator pedal position, said first selection means operating said first moving means on the basis of said first data to obtain a primary pulley radius associated with one of said desired primary shaft rpm values, wherein said memory of said first selection means further contains second data corresponding to desired positions of the throttle valve for respective positions of the accelerator pedal, and wherein for each respective accelerator pedal position, said first selection means operates said throttle valve on the basis of said second data to obtain a desired position of the throttle valve.

16. A transmission according to claim 15, further comprising:

a second selection means for operating said transmission in a fast acceleration mode and having a second memory, wherein said second selection means is connected to receive signals corresponding to the accelerator pedal position and signals corresponding to the instantaneous value of the rpm of the secondary shaft, wherein said second memory contains third data corresponding to desired instantaneous primary shaft rpm valves as a function of the accelerator pedal position for respective valves of instantaneous secondary shaft rpm, and wherein for a respective accelerator pedal position, said second selection means operates said first moving means on the basis of said third data to firstly obtain a primary pulley radius associated with a corresponding one of said desired primary shaft rpm values, and to secondly obtain desired position of the throttle valve for respective positions of the accelerator pedal; and means for selecting between said first selection means and said second selection means.

17. A transmission according to claim 16, wherein said first selection means and said second selection means each comprise means for generating a signal corresponding to a desired instantaneous primary shaft rpm and wherein said primary electronic control means further comprises first and second averaging means for reducing variations in said desired primary shaft speed signal, said first averaging means being connected to receive said instantaneous primary shaft rpm signal from said first and second selection means.

18. A transmission according to claim 16, further comprising means for controlling instantaneous throttle valve position, said throttle valve position control means being connected to receive first throttle position signals from said first selection means and being connected to receive second throttle position signals from said second selection means, wherein instantaneous throttle valve position settings are selected from data stored in the memory of said selection means and wherein respective throttle valve position signals are generated in response thereto.

19. A transmission according to claim 18, wherein the transmission is provided with third and fourth averaging means for reducing variations in said throttle valve position signals, said third averaging means being connected to receive said throttle valve position signals from said first selection means and being connected to said throttle valve position control means and said fourth averaging means being connected to receive said throttle valve position signals from said second selection means and being connected to said throttle valve position control means.

20. A transmission according to claim 15 or 19, further comprising:

secondary electronic control means for operating said second moving means, said secondary electronic control means including:
a first processing means operatively connected to receive signals corresponding to actual positions of said throttle valve and signals corresponding to instantaneous actual engine rpm, said first processing means including a memory containing data corresponding to estimates of instantaneous engine torque as a function of actual throttle valve position for each value of actual instantaneous engine rpm, and said first processing means generating engine torque signals corresponding to said estimate of instantaneous engine torque; first correction means connected to said first processing means being connected to receive said engine torque signals and being connected to receive slip signals corresponding to instantaneous ratios of primary shaft rpm to engine rpm, and having means for generating signals corresponding to an estimate of instantaneous primary shaft torque, wherein said first correction means is operatively connected to said second moving means for changing the tension in the driving belt in response to changes in said primary shaft torque signals.

21. A transmission according to claim 20, wherein said secondary electronic control means further comprises means for generating said slip signals, said slip signal generating means being connected to said first correction means receiving corresponding to values of instantaneous primary shaft rpm and an engine rpm signal corresponding to values of instantaneous engine rpm, and including means for calculating the ratio of instantaneous primary shaft rpm to instantaneous engine rpm.

22. A transmission according to claim 21, wherein said secondary electronic control means further includes means for generating transmission ratio signals corresponding to a ratio of instantaneous primary shaft rpm to instantaneous secondary shaft rpm and means for generating signals corresponding to instantaneous secondary shaft torque, said secondary shaft torque signal generating means being connected to receive said transmission ration signals and instantaneous secondary shaft torque signals.

23. A transmission according to claim 22, wherein said secondary electronic control means further includes means for generating signals corresponding to estimates of the radius of the secondary pulley, said secondary radius signal generating means being coupled to said transmission ratio signal generating means.

24. A transmission according to claim 23, wherein said secondary control means further includes means for generating first pressure signals, said first pressure signals corresponding to a first estimate of desired secondary pulley pressure and said first pressure signal generating means being connected to receive said secondary radius signals and said secondary torque signals.

25. A transmission according to claim 24, wherein said secondary electronic control means further includes means for generating signals corresponding to centrifugal force on said secondary pulley, and means for generating a second pressure signal corresponding to a second estimate of desired secondary pulley pressure, said second pressure signal generating means being connected to receive said first pressure signals and to receive said centrifugal force signals, wherein said second estimate of desired secondary pulley pressure compensates for centrifugal force acting on said secondary pulley.

26. A transmission according to claim 20, further including clutch control means coupled to the secondary shaft, said clutch control means being connected to said first correction means and being operable in response to instantaneous primary shaft torque signals received therefrom.

27. A transmission according to claim 20, wherein said secondary electronic control means further includes sensor means, said sensor means being coupled to the secondary moving means and generating a signal in response to undesirable torque variations resulting from the road surface or the engine, and wherein said secondary electronic control means further includes means for adjusting the tension in said driving belt to compensate for said variations before said torque variations reach the transmission.

* * * * *